United States Patent
Hefner et al.

(10) Patent No.: US 7,082,311 B2
(45) Date of Patent: Jul. 25, 2006

(54) LOCATION TECHNOLOGY SUPPORT DETERMINATIONS IN WIRELESS COMMUNICATIONS NETWORKS AND DEVICES

(75) Inventors: Eric Hefner, Gurnee, IL (US); Christopher Bussan, Crystal Lake, IL (US); William DeClerck, Palatine, IL (US); Mark E. Pecen, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 182 days.

(21) Appl. No.: 10/348,055

(22) Filed: Jan. 21, 2003

(65) Prior Publication Data

US 2004/0142702 A1 Jul. 22, 2004

(51) Int. Cl.
*H04Q 7/20* (2006.01)
(52) U.S. Cl. .................. 455/456.1; 455/456.2; 455/456.4; 455/456.5; 455/456.6; 342/357.14
(58) Field of Classification Search ............. 455/456.1, 455/456.2, 456.5, 456.6, 458, 456.4; 342/357.01, 342/357.06, 357.14
See application file for complete search history.

(56) References Cited

U.S. PATENT DOCUMENTS 5,724,660 A * 3/1998 Kauser et al. ............ 455/456.2
6,002,936 A * 12/1999 Roel-Ng et al. ......... 455/456.4
6,389,291 B1 * 5/2002 Pande et al. .............. 455/456.5
6,466,938 B1 * 10/2002 Goldberg ................. 455/456.1
2004/0002814 A1 * 1/2004 Gogic ..................... 455/456.1

OTHER PUBLICATIONS

"Digital cellular telecommunications system (Phase 2+), Location Services (LCS0; Mobile Station (MS)—Serving Mobile Location Centre (SMLC) Radio Resource LCS Protocol (RRLP)" (GSM 04.31 version 8.1.0 Release 1999), 52 pages.

"Digital cellular telecommunications system (Phase 2+); Location Services (LCS); Broadcast Network Assistance for Enhanced Observed Time Difference (E-OTD) and Global Positioning System (GPS) Positioning Methods", (GSM 04.35 version 8.1.0 Release 1999), 36 pages.

* cited by examiner

*Primary Examiner*—Joseph Feild
*Assistant Examiner*—Huy D. Nguyen
(74) *Attorney, Agent, or Firm*—Roland K. Bowler, II

(57) ABSTRACT

A method for determining location technology supported by a wireless communications network including sending (505) a location request, for example a MO-LR request, from a mobile wireless subscriber device to the network, receiving a network response (515) in reply to the location request, determining the subscriber device location technology supported by the network from the network response (535, 550), and in some embodiments the location technology of the subscriber device is controlled based on the technology supported by the network.

10 Claims, 5 Drawing Sheets

| TECHNOLOGY | BIT | BIT STATES |
|---|---|---|
| NW BASED | 1 | 0-NOT SUPPORTED |
| | | 1-SUPPORTED |
| MS CONVENTIONAL GPS | 2 | 0-NOT SUPPORTED |
| | | 1-SUPPORTED |
| MS BASED GPS | 3 | 0-NOT SUPPORTED |
| | | 1-SUPPORTED |
| MS ASSISTED GPS | 4 | 0-NOT SUPPORTED |
| | | 1-SUPPORTED |
| MS BASED E-OTD | 5 | 0-NOT SUPPORTED |
| | | 1-SUPPORTED |
| MS ASSISTED E-OTD | 6 | 0-NOT SUPPORTED |
| | | 1-SUPPORTED |

| TECHNOLOGY | BIT | BIT STATES |
|---|---|---|
| NW BASED | 1 | 0-NOT SUPPORTED |
| | | 1-SUPPORTED |
| MS CONVENTIONAL GPS | 2 | 0-NOT SUPPORTED |
| | | 1-SUPPORTED |
| MS BASED GPS | 3 | 0-NOT SUPPORTED |
| | | 1-SUPPORTED |
| MS ASSISTED GPS | 4 | 0-NOT SUPPORTED |
| | | 1-SUPPORTED |
| MS BASED E-OTD | 5 | 0-NOT SUPPORTED |
| | | 1-SUPPORTED |
| MS ASSISTED E-OTD | 6 | 0-NOT SUPPORTED |
| | | 1-SUPPORTED |

*FIG. 2*

LOCATION TECHNOLOGY SUPPORT DETERMINATIONS IN WIRELESS COMMUNICATIONS NETWORKS AND DEVICES

FIELD OF THE INVENTIONS

The present inventions relate generally to wireless communications, and more particularly to the determination of whether and which location technology, for example, satellite-positioning system (SPS) based and/or network-based mobile subscriber device location determination services, if any, are supported by wireless communications networks, and methods therefor.

BACKGROUND OF THE INVENTIONS

Mobile wireless communications subscriber devices and cellular subscriber communications networks are increasingly providing and supporting technologies that enable and exploit the location of the subscriber devices, for example, for compliance with the emergency location services, like E-911 mandated by the Federal Communications Commission, and increasingly for location-based e-commerce services and applications.

Some satellite positioning system (SPS) enabled subscriber devices compute position at the subscriber device. In some instances the subscriber device computes location autonomously. In communications networks, however, many subscriber devices require assistance information from the network for accurate location computation. This information may include, for example, precise time, frequency calibration, and satellite positioning system navigation information, etc. Other SPS enabled subscriber devices provide information, for example, pseudorange measurements, to the network, which computes the position of the subscriber device.

Other location technologies also rely on information provided by the subscriber device. MS-assisted Enhanced Observed Time Difference (E-OTD) location technologies, for example, rely upon timing measurements made by subscriber devices. In the case of MS-assisted E-OTD technology, some subscriber devices perform neighbor cell measurements in anticipation of E-OTD location requests by the network.

Many communications networks however do not support location technologies, and some networks support one technology but not others. Thus many subscriber devices may perform location measurements or computations that are not required by a particular network, resulting in unnecessary power consumption and less than optimal resource allocation. Anticipatory E-OTD measurements taken in idle mode/standby or camped state will, for example, increase current drain, which reduces battery life. Some subscriber device E-OTD software may reduce battery life by as much as 5 or 10 percent, depending, for example, on the frequency with which the subscriber device makes E-OTD measurements, among other factors.

Global System for Mobile Communications (GSM) 04.31, Radio Resource Location Services Protocol (RRLP) specifies the location technology supported by networks in a location request message. Under this standard, however, a subscriber device does not know what location technology is supported by the network until a location request is received by the subscriber device from the network. Meanwhile, the subscriber device may make power consuming location measurements that are unsupported or not required by the network.

GSM 04.35, Broadcast Network Assistance For E-OTD and Global Positioning System (GPS) Methods specifies the broadcast of E-OTD and GPS Assistance Data in an SMS Cell Broadcast (SMSBC) message. The E-OTD Assistance data includes base station coordinate information, and the GPS assistance data includes GPS Differential Correction data for computing location at the subscriber device using E-OTD and GPS technologies, respectively.

In some subscriber devices, location measurements made at the subscriber device may affect its operation. In some devices, for example, anticipatory E-OTD measurements require resources that would otherwise be allocated for dedicated modes of operation, resulting in the degradation of adjacent channel scanning and searching performance.

The various aspects, features and advantages of the present inventions will become more fully apparent to those having ordinary skill in the art upon careful consideration of the following Detailed Description of the Invention with the accompanying drawings described below.

BRIEF DESCRIPTION OF THE DRAWINGS

FIG. 2 is an exemplary table illustrating a bit field for indicating which location technologies a network supports.

DETAILED DESCRIPTION OF THE INVENTIONS

Figure 1:
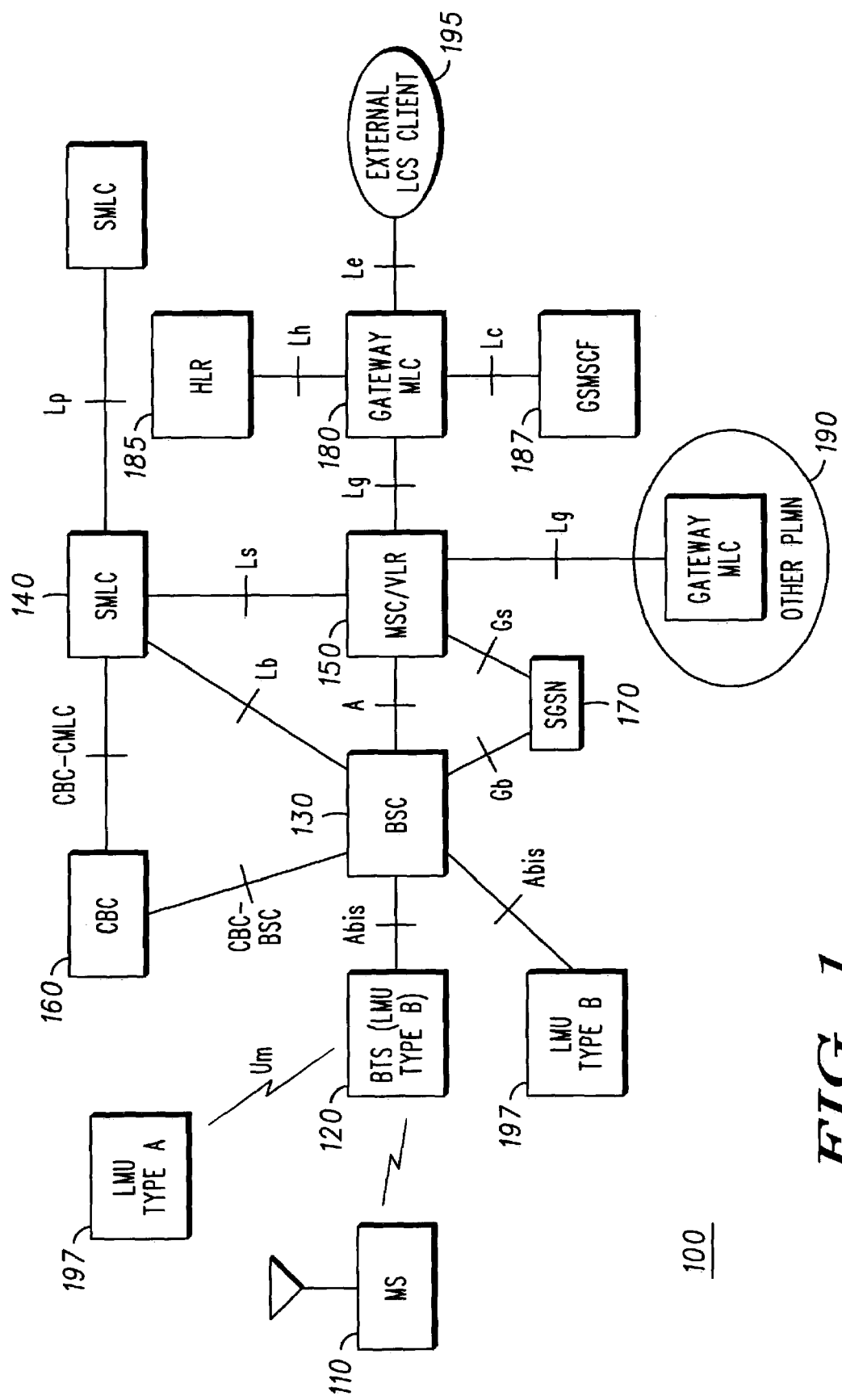
FIG. 1 is an exemplary wireless communications network.

FIG. 1 illustrates an exemplary wireless communications network in the form of a Global System For Mobile communications (GSM) network 100 supporting wireless communications for mobile wireless communication devices, for example, mobile station (MS) 110, also referred to herein as a mobile wireless communications device.

The mobile wireless communications device may be a wireless cellular telephone, or a two-way pager, or a wireless enabled personal digital assistant (PDA) or notebook or laptop computer, or some other radio communications device, anyone of which may be a cellular communications service subscriber device.

The exemplary network 100 comprises generally a plurality of base-station transceivers (BTS) 120 that communicate with a base station controller (BSC) 130, which communicates with a Serving Mobile Location Center (SMLC) 140, a Mobile Switching Center/Visitor Location Register (MSC/LVR) 150 and a Cell Broadcast Controller (CBC) 160. The BSC and MSC/LVR are communicably coupled to a Serving GPRS Switching Node (SGSN) 170. The MSC/LVR is communicably coupled to the SMLC 140, a Gateway MLC (GMLC) 180 and a GMLC in another Public Land Mobile Network (PLMN) 190. In FIG. 1, the gateway MLC is coupled to a Home Location Register (HLR) and to a gsmSCF 187. These and other aspects of GSM and other communications network architectures are known generally.

The exemplary GSM network 100 includes a plurality Location Measurement Units (LMUs) 197 which are located at the BTS and at other locations in the network for supporting Enhanced Observed Time Difference (E-OTD) GSM Location Services (LCS), and possibly other location technologies. Location requests may originate from within the network, for example, from a network location server, like an SMLC or from the MS 110. Location requests may also originate from external clients 195, for example, E-911 centers. The LCS architecture has two general variations. In MS-assisted location architectures, location is determined at the network, for example, at the SMLC, with information received from the MS. In MS-based location architectures, location is computed at the MS with information received from the network. The MS location information is then communicated to the requestor or other destination. The exemplary GSM communications network may also support other location services as specified, for example, in GSM 04.35, Broadcast Network Assistance For E-OTD and Global Positioning System (GPS) Methods.

The GSM communications network architecture of FIG. 1 is only exemplary and not intended to limit the invention. The inventions apply more generally to any communications networks that provide or support location services, including, for example, 3rd Generation (3G) Universal Terrestrial Radio Access Network (UTRAN), 4th Generation communications networks and among other existing and future communications network and systems. These and other networks may support E-OTD and other location services including, for example, Global Positioning System (GPS) and other satellite positioning system location services, as well network based location services, for example, Time of Arrival (TOA), Time Difference of Arrival (TDOA), Angle of Arrival (AOA), among other location determination schemes, including fused location schemes, or combinations thereof.

According to one aspect of the invention, a communications network transmits a communication, which is in the form of message in some networks, to one or more mobile wireless communications devices located in or communicating with the wireless communications network specifying, in the communication transmitted from the network, mobile wireless communications device location technology support information about the wireless communications network.

In one embodiment, the communication transmitted by the network specifies at least one location technology not supported by the wireless communications network. In another embodiment, the network communication specifies at least one location technology supported by the wireless communications network. In other embodiments, the network message transmitted to one or more mobile wireless communications devices in the wireless communications network specifies location technology supported and location technology not supported by the wireless communications network. In some embodiments, the message specifies a preferred location technology supported by the wireless communications network, for example, in communications networks that support more than one location technology.

In one embodiment, the message from the network has at least one bit that is set, or unset, to indicate whether the network supports location technology, for example, to indicate whether or not the network supports any location.

FIG. 2 illustrates another scheme where each of several bits in the network communication corresponds to a different location technology. Setting the bit to "1" indicates that the corresponding technology is supported, although in other embodiments the opposite may be true. IN FIG. 2, "Bit 1" corresponds to a network-based technology, for example, TDOA location technology. "Bit 2" corresponds to conventional GPS location technology, "Bit 3" corresponds to MS-based GPS location technology, "Bit 4" corresponds to MS-assisted GPS location technology, "Bit 5" corresponds to MS-based E-OTD location technology, and "Bit 6" corresponds to MS-assisted E-OTD location technology. Other network messages may include more or fewer bits. Alternatively, the Bits may have different location technologies associated therewith.

In one embodiment, the communications network preferably transmits the network message specifying mobile wireless communications device location technology support information about the wireless communications network before transmitting a location request to a mobile wireless communications device in the network. An exemplary location request for GSM networks is specified in Global System for Mobile Communications (GSM) Q4.31, Radio Resource Location Services Protocol (RRLP). Other communications networks transmit similar locations requests to mobile stations in the network. In some applications, the MS provides information from which the network may compute location, for example, E-OTD or GPS measurements in response to the network location request. In other applications, the MS computes and provides its location in response to the network location request.

In one embodiment, the communications network transmits the mobile wireless communications device location technology support information to the mobile stations in a network overhead broadcast message. In other applications, the message is transmitted on a dedicated radio resource channel. The message is preferably transmitted to and received by mobile station or subscriber device immediately upon entering the network.

In other embodiments, the mobile wireless communications device location technology support information is specified in a system information broadcast (SIB) communication or message, or alternatively in a cell broadcast message, for example, an SMSCB message in a GSM network. In other embodiments, the mobile wireless communications device location technology support information is specified in a paging message or in some other message transmitted by the network. The information is preferably communicated so that it will be received by the mobile station as soon as the mobile station enters the network, or shortly thereafter.

According to another aspect of the invention, the network communication specifying mobile wireless communications device location technology support information is transmitted in response to the receipt of a message transmitted to the network from the mobile wireless communications device.

In one embodiment, the network communication specifying mobile wireless communications device location technology support information about the wireless communications network is transmitted in response to receipt of a registration request from the mobile wireless communications device.

Figure 3:
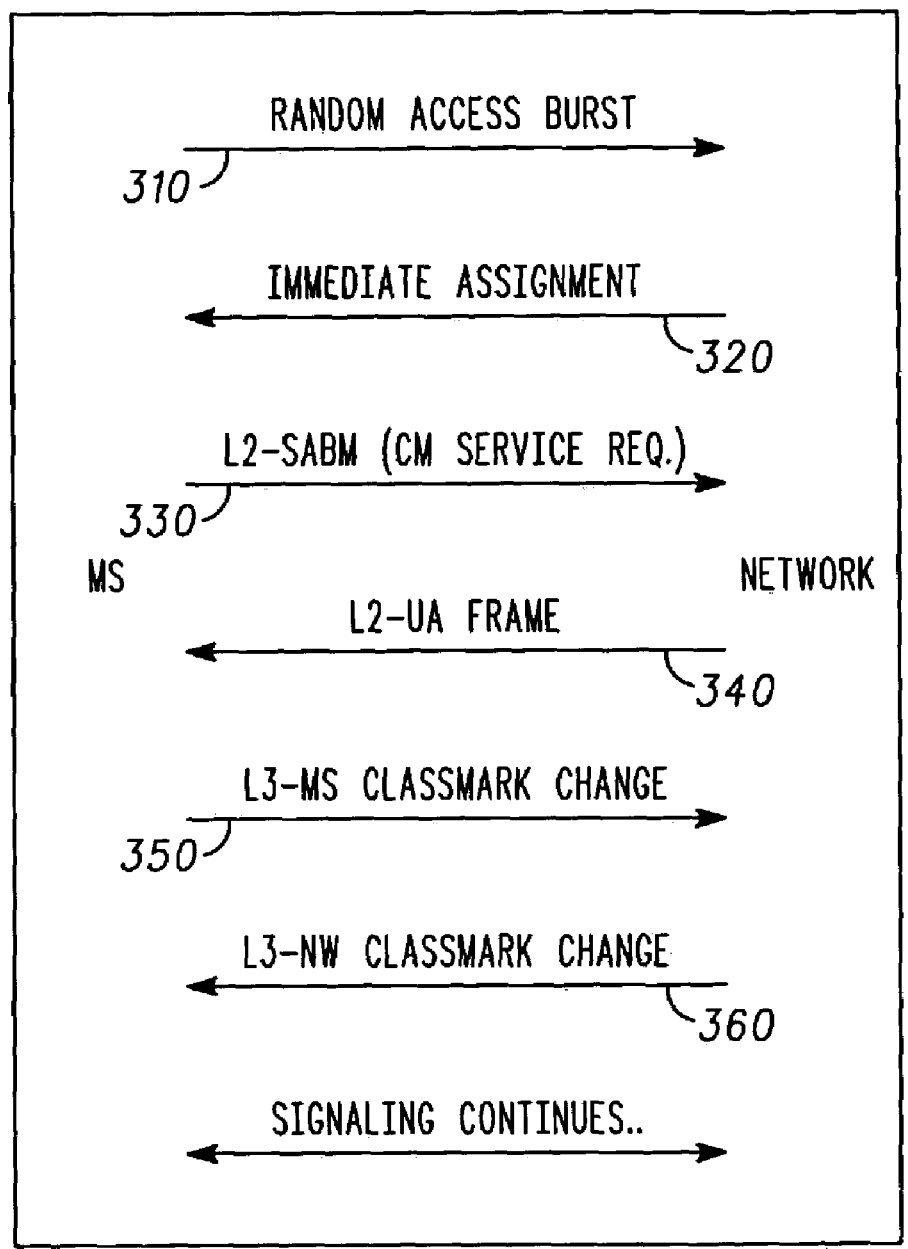
FIG. 3 is an exemplary communications exchange ladder between a mobile station and a network.

In the communications exchange ladder 300 between the network (NW) and mobile station (MS) of FIG. 3, the MS requests a channel assignment, for example, by transmitting a random access burst to the network at communication 310, and at communication 320 the network responds with an immediate channel assignment. In some embodiments, the communication from the network having the network location technology support information is sent in response to the channel assignment request from the MS. The network location technology support information may be included, for example, in the immediate channel assignment sent by the network, or in some other communication sent by the network shortly after receiving the channel assignment request from the MS.

FIG. 3 illustrates, for the sake of completion, a connection management (CM) service request from the MS at communication 330, and a UA frame response from the network at communication 340.

In another embodiment, the MS transmits a classmark change communication to the network. The network transmits a reply, for example, a classmark response, specifying mobile wireless communications device location technology support information in response to the classmark change message from the mobile wireless communications device. In some applications, the MS provides the network with information about the location technology supported by the MS in the classmark change communication.

FIG. 3 illustrates an exemplary communications exchange 300 between a network and an MS in which an early classmark change message and response are communicated between the MS and network. The MS sends the classmark change message at 350, and the network responds with a classmark response at 360.

Figure 4:
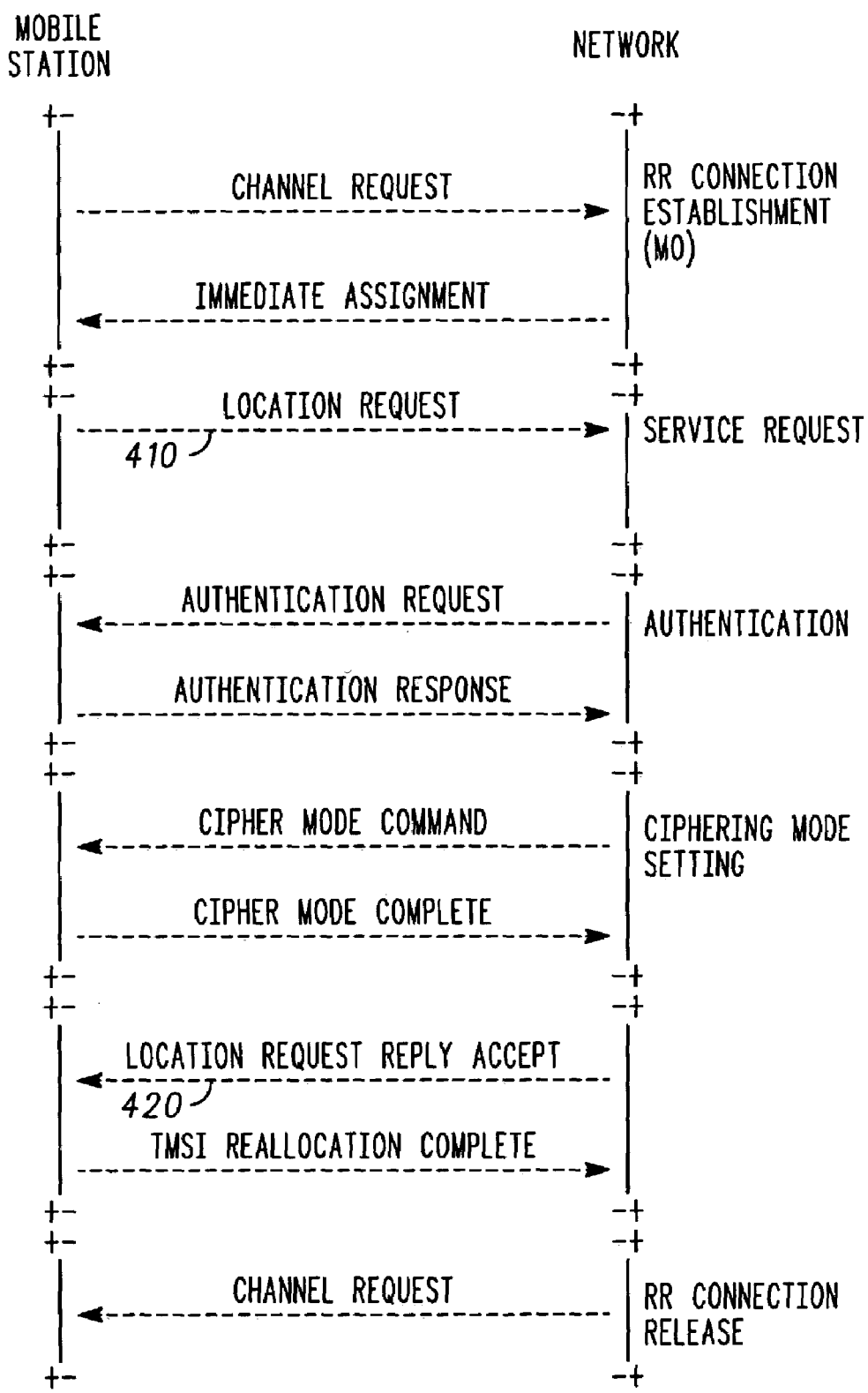
FIG. 4 is another exemplary communications exchange ladder between a mobile station and a network.

FIG. 4 illustrates another communication exchange ladder 400 between a mobile station (MS) and a network that includes a channel request and an immediate assignment as discussed above in FIG. 3, which is relevant only to the extent that it indicates that the MS is attached to the network. At 410, the MS transmits a location request, or a location update 10, request, to the network, and the network responds with a communication specifying mobile wireless communications device location technology support information. In FIG. 4, the location request is communicated after the MS channel assignment.

In other embodiments, the network transmits the communication specifying mobile wireless communications device location technology support information in response to a periodic location update message from the MS, or in response to a location area update message, or to an international mobile subscriber identity (IMSI) attach message from the MS. In FIG. 4, at 420, the network transmits network location technology support information in a location update accept communication.

The mobile wireless communications device, and particularly the location technology thereof, is preferably operated based on the received communication specifying at least one of a mobile wireless communications device location technology supported by a wireless communications network or a mobile wireless communications device location technology not supported by a wireless communications network before received a network location request.

In some embodiments, the location technology of the mobile wireless communications device is controlled based on the location technology supported, or not supported, by the network. If the network does not support any location technology, the MS may avoid allocating resources to the location technology on the MS since the network does not require or support the technology. In some embodiments, for example, the MS may discontinue making E-OTD measurements or GPS pseudorange measurements in anticipation of a network request for such information. In other embodiments, if the MS supports more than one location technology, for example, E-OTD and GPS technology, and the network supports only one or the other, the MS may operate only the technology supported by the network.

In some embodiments of the invention, the MS invokes a network location request by sending a request for location to the network, for example, by sending a MO-LR request in GSM networks. In reply to the location request from the MS, the network generally provides a response from which the MS may determine whether and, in some embodiments, which particular location technology is supported by the network. With this information about which location technology is supported by the network, the MS may In the exemplary process flow diagram of FIG. 5, at block 505, a determination is made whether network MO-LR polling is enabled, which indicates that the MS will request its own position in an effort to determine what location technology is supported by the network. Generally, network polling is enabled every time there is a change in network status, for example, upon the occurrence of each network registration. If polling is not enabled, the MS monitors changes in network status at block 510. If a change in network status occurs network polling is enabled and the processing proceeds to block 515.

At block 515, the MS requests its position from the network, for example by transmitting a MO-LR. In some embodiments, the location request is transmitted by the MS upon entering a new network or network area, and preferably before receiving a location request from the network.

At block 520, the MS receives a network response. In the case where the MS made a location request, at block 515, and the response includes a request for location measurement information from the MS, at block 530, the MS determines and stores the information regarding the network location technology supported at block 535. This information may be determined from the nature of the request for location measurement information from the network.

At block 540, the MS is configured, if necessary, to optimize it location technology to match the location technology supported by the network, for example, by enabling the corresponding location technology in the MS. This may also include controlling the operation of a particular location technology in the MS, for example, by setting the measurement acquisition rate, etc., if different than that required by the network, provided the MS has the capability to comply with the network requirements. Thereafter, the process ends and begins anew.

Figure 5:
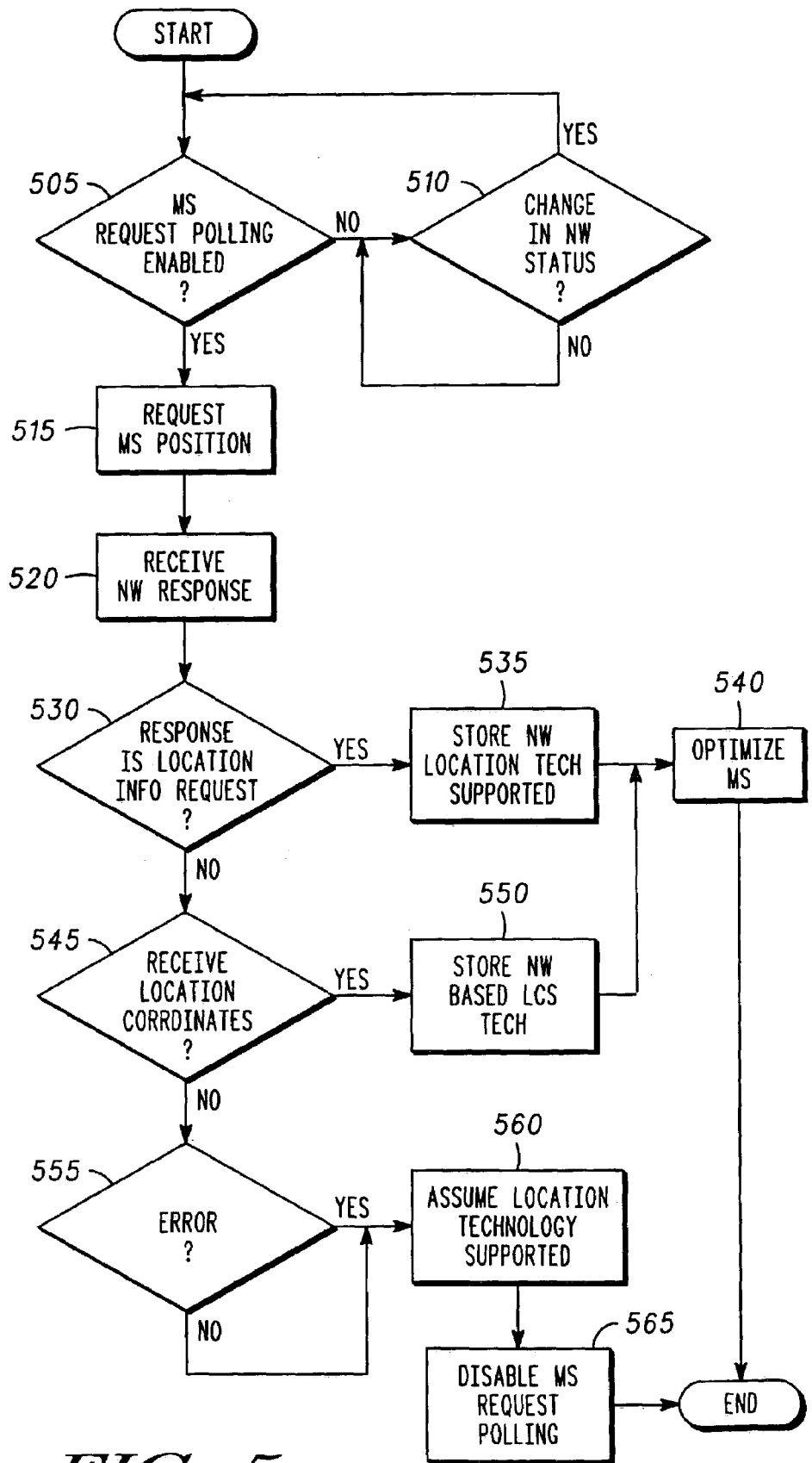
FIG. 5 is an exemplary communications flow diagram.

In FIG. 5, at block 545, if the MS receives location information from the network, for example, latitude and longitude coordinates in response to the location request, the MS enters and stores the information indicating that the network supports network based location services at block 550. The MS is also configured, at block 540, if necessary, to optimize it location technology to match the location technology supported by the network, for example, by disabling unused location technology in the MS. Thereafter, the process ends and begins anew.

In FIG. 5, at block 555, if an error response is received from the network, an assumption is made at block 560 that the network supports location technology, and the MS request polling is disabled at block 565. Thereafter, the process ends and begins anew.

While the present inventions and what are considered presently to be the best modes thereof have been described sufficiently to establish possession by the inventors and to enable those of ordinary skill to make and use the inventions, it will be understood and appreciated that there are equivalents to the exemplary embodiments disclosed herein and that many modifications and variations may be made thereto without departing from the scope and spirit of the inventions, which are to be limited not by the exemplary embodiments but by the claims appended hereto.

The invention claimed is:

1. A method in a wireless communications network, the method comprising:

transmitting a message from the network for reception by at least one mobile wireless communications device in the wireless communications network before transmitting a location request to the mobile wireless communication device;

specifying, in the message transmitted, mobile wireless communications device location technology support information about the wireless communications network.

2. The method of claim 1, specifying mobile wireless communications device location technology support information about the wireless communications network includes specifying at least one location technology not supported by the wireless communications network.

3. The method of claim 1, specifying mobile wireless communications device location technology support information about the wireless communications network includes specifying at least one location technology supported by the wireless communications network.

4. The method of claim 1, specifying mobile wireless communications device location technology support information about the wireless communications network includes specifying a preferred location technology supported by the wireless communications network.

5. The method of claim 1, transmitting the message includes transmitting a network overhead broadcast message, specifying mobile wireless communications device location technology support information about the wireless communications network in the network overhead broadcast message.

6. The method of claim 1, transmitting the message includes transmitting at least one of a system information broadcast message, a cell broadcast message, or a paging message;

specifying mobile wireless communications device location technology support information about the wireless communications network in the at least one of the system information broadcast message, the cell broadcast message, or the paging message transmitted.

7. The method of claim 1, transmitting the message on a dedicated radio resource channel.

8. A method in a wireless communications network, the method comprising:

transmitting a broadcast message from the network for reception by at least one mobile wireless communications device in the wireless communications network;

specifying more than one location technology supported by the wireless communications network in the broadcast message transmitted.

9. A method in a wireless communications network, the method comprising:

transmitting a message from the network for reception by at least one mobile wireless communications device in the wireless communications network; specifying multiple location technologies supported by the wireless communications network in the message transmitted; and specifying a preferred location technology supported by the wireless communications network in the message transmitted.

10. A method in a wireless communications network, the method comprising:

transmitting a message from the network for reception by at least one mobile wireless communications device in the wireless communications network before transmitting a location request to the mobile wireless communication device;

specifying more than one location technology supported by the wireless communications network in the message transmitted.

* * * * *